Figure 1:
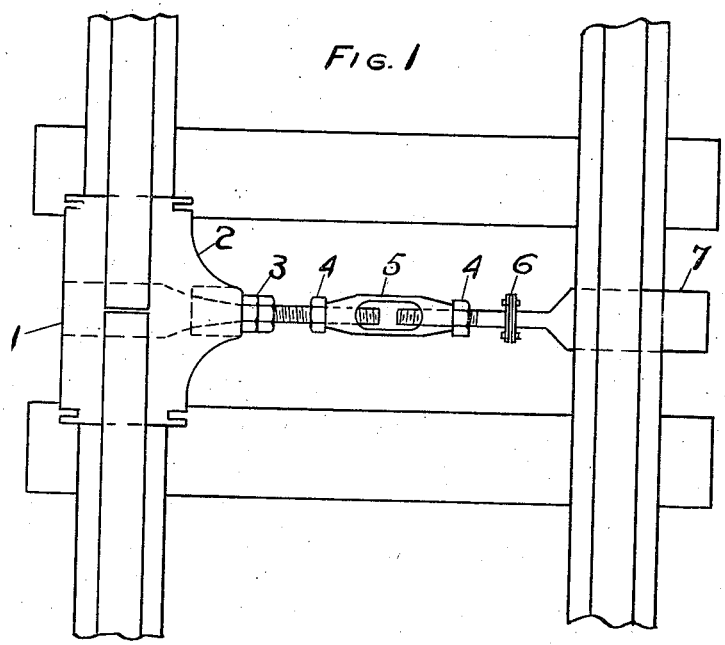

C. A. PROVOST.
RAILWAY.
APPLICATION FILED APR. 26, 1915.

1,162,251.

Patented Nov. 30, 1915.

Witnesses
Elvin L. Dow
Peter W. Prun

Inventor
Charles A. Provost

UNITED STATES PATENT OFFICE.

CHARLES A. PROVOST, OF MORRISVILLE, PENNSYLVANIA, ASSIGNOR OF ONE-THIRD TO JOHN L. POWER, OF TRENTON, NEW JERSEY.

RAILWAY.

1,162,251.   Specification of Letters Patent.   Patented Nov. 30, 1915.

Application filed April 26, 1915. Serial No. 24,103.

*To all whom it may concern:*

Be it known that I, CHARLES A. PROVOST, a citizen of the United States, residing at Morrisville, in the county of Bucks and the State of Pennsylvania, have invented certain new and useful Improvements in Railways; and I declare the following to be a full, clear, and exact description of the invention, reference being had to the accompanying drawings, and to the figures of reference marked thereon, which form a part of the specification.

My invention relates to improvements in railroads, particularly to the splicing of rails and gage, and its object is to eliminate fish-plates, holes in the rails, bolts, nuts and any other thing tending to weaken the rails at point of splicing, and its object is to strengthen the splice and gage and to prevent the spreading of the rails and the consequent derailment of the train or cars, and to these ends the invention consists in the detailed construction, combination and arrangement of the parts substantially as hereinafter more fully disclosed and pointed out in the claim.

In the drawing forming part of this specification the separate parts of my invention on the accompanying drawing are designated by the same numerals of reference in each of the views.

Figure 2:
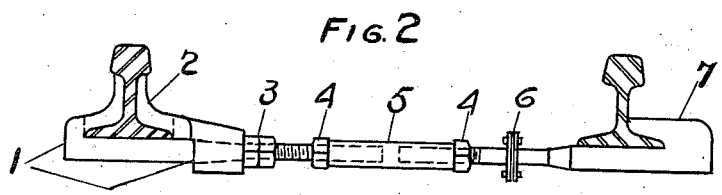
Figure 3:
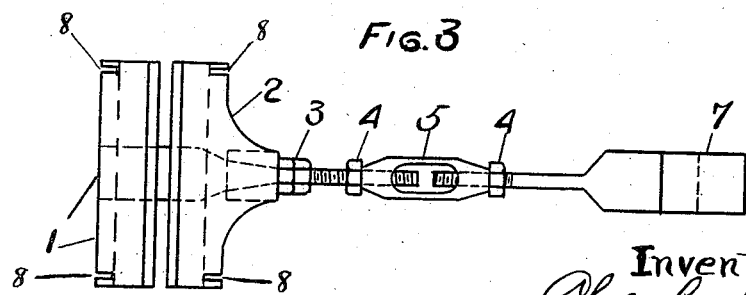

In the accompanying drawing Figure 1 is a plan view of my invention, Fig. 2, is a side view attached to the splice and opposite rail, showing the joint splice 1 and 2; gage adjustment 5, insulation joint 6, and the binding clamp 7 making fast to the rail opposite the splice in actual position on the rails. Fig. 3 is a plan view showing the joint splice detached.

In the embodiment of the invention is employed a portion of the joint splice 1, consisting of a piece of iron or metal shaped as a shoulder to fit the outside of the rail under the top flange and against the bottom flange and extending the desired distance on either side of the joint, the central portion passing around the lower or bottom flange and underneath both ends of the rails at the joint supporting them and protecting the ends of the rails from being mashed, (eliminating much of the noise in the joints of the rails) tapering to a stem which passes through an opening in the inside joint splice 2, consisting of a piece of iron or metal shaped as a shoulder to fit against the inside of the rails under the top flange, and against the bottom flange parts 1 and 2 forming a vise or clamp and locked in position by lock nuts 3, the stem portion being threaded. The threaded stem 1 enters lock nuts and the coupling swivel or gage adjustment 5. Entering the opposite end of the gage adjustment 5 is the threaded stem portion of the insulation joint 6, locked by lock nuts. The insulation joint 6 is connected by bolts and may be disconnected and insulated when desired without disturbing the aforesaid joint splice 1 and 2. The binding clamp 7, extends from the insulation joint 6 under the rail and the elongated jaw clamps over the outside bottom flange of the rail opposite the joint splice; thus tying together the rails and strengthening the gage. The gage adjustment 5, has a right and left handed screw thread sleeve or coupling being adapted to work upon right and left handed screw threads of said stems respectively and is locked by lock nuts 4, thus making it possible to adjust the gage by turning the same with a suitable wrench in the hands of an operator, thus holding the rail-sections against spreading thereby preventing the possible derailment of the train or cars from that cause. The gage adjustment also makes it possible to accomplish any variation or difference of width between the rails.

Fig. 1, shows a flat flange on each side of the joint co-extensive with 1 and 2, and shows notches 8, resting upon the ties on either side adapted to receive spikes which tend to further secure the joint splice to the ties, preventing the possible movement of the joint splice and securing the same to the road-bed.

The herein described joint splice, or means for splicing of rails is a means substituted for other methods heretofore used for the splicing of rails which tended to weaken the said rails and gage. The joint splice or means herein employed in splicing of rails and securing the gage of the road may be made in any angle, size and weight which would be adaptable to the condition. This improved means of splicing rails of railways and securing the standard gage thereof, is simple in construction and operation, strong and durable.

Having thus fully described my inven- tion what I claim and desire to secure by Letters Patent is:

A joint splice, clamp, tie or connecting means for railways comprising two pieces of metal designed and shaped to fit the rails underneath the top flange and against the base flange with bearing-surfaces on both sides of the rail at the joint; the outside or clamping piece of metal, with co-extended base flanges, with notches, extending along the side and underneath the rails so as to over-lap or rest upon the ties on each side of the joint, the central portion tapering to a stem which passes through the inside piece of the joint splice which is shaped and designed to receive it threaded at this point and locked in position with lock nuts, the stem portion extending and entering lock nuts and a coupling swivel or gage adjustment upon the same threads, in combination with a clamp member engaging the base of the opposite rail and being provided with a threaded stem adapted to enter said coupling swivel substantially as specified.

In testimony that I claim the foregoing as my invention I have signed my name, in the presence of the subscribing witnesses, this sixth day of Aug., 1915.

CHARLES A. PROVOST.

Witnesses:
HARRY S. PROVOST,
JOHN L. POWER.